UNITED STATES PATENT OFFICE.

JAY FRANK SCHAMBERG, GEORGE W. RAIZISS, AND JOHN A. KOLMER, OF PHILADELPHIA, PENNSYLVANIA, ASSIGNORS TO DERMATOLOGICAL RESEARCH LABORATORIES, OF PHILADELPHIA, PENNSYLVANIA, A CORPORATION OF PENNSYLVANIA.

OXYMERCURY NITROPHENOLATE.

1,390,972.  Specification of Letters Patent.  Patented Sept. 13, 1921.

No Drawing.  Application filed April 21, 1920. Serial No. 375,456.

*To all whom it may concern:*

Be it known that we, JAY FRANK SCHAMBERG, GEORGE W. RAIZISS, and JOHN A. KOLMER, citizens of the United States, residing in the city of Philadelphia, State of Pennsylvania, have jointly invented a certain new and useful Oxymercury Nitrophenolate and Process of Producing the Same.

Our invention has for its object the production of a new chemical body having especial utility for its germicidal and antiseptic properties, and which we have found, from extensive chemo-therapeutic investigations in our research laboratory, to possess great therapeutic value, including disinfection of the hands for surgical operations, sterilization of rubber tubing, remarkable disinfectant activity on feces and other infectious material in which protein is present, and exhibiting no evidence of tarnishing on metals specifically nickel-plated surgical instruments in weak solutions of which they have been sterilized. It differs very materially from other mercury compounds, such as mercuric chlorid for example, in many, if not all of the results of its use in the examples thereof hereinabove stated.

Our new product is an alkali salt, (whether sodium or potassium) of any oxymercury nitrophenol compound, whether the nitrophenol employed be the ortho, meta or para variety of that element.

An example of the sodium salt of the mercuric compound above referred to, in which the ortho nitrophenol has been selectively used, for illustration, may be chemically designated as a sodium-oxy-mercury-ortho nitrophenolate, having the structural formula

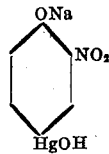

and containing a slight excess over 50% of mercury.

Our invention is of the new product including a novel method hereinafter described of producing such an alkali salt of oxy-mercury nitro-phenol, the novel ultimate resultant of which is a crystalline product, of yellow color, a solium hydroxid solution whereof properly filtered and evaporated produces a crystalline powder of brick red color, showing a deep amber color in solution, odorless, having a slightly bitter metallic taste in strong solutions, but practically tasteless in weak solutions, having a decomposition point of about 290° C., soluble in cold water, more freely soluble in hot water and capable of being molded into tablets, equally soluble.

We will now describe our new method of producing the compound, of which the above example is given:

100 grams of purified ortho-nitro-phenol are dissolved, preferably in an enameled pot, in 1500 c. c. distilled water plus 100 c. c. of 40% sodium hydroxid by warming on a steam bath. A small amount of the oil remains which may be disregarded.

223 grs. of mercuric acetate C. P. are dissolved in 1500 c. c. distilled water containing 5 c. c. of glacial acetic acid, in the cold. The solution is then filtered. This solution is added to the ortho-nitro-phenol solution in the enameled pot; and warmed up to 50° C. on a water bath; the same is stirred mechanically while the mercuric acetate solution is added drop by drop until one quarter of the total amount thereof has been introduced. 10 c. c. of 40% sodium hydroxid solution are now added drop by drop. The temperature then raised 65° C. The second one-quarter of the volume of the mercuric acetate solution is then introduced. 10 more of 40% sodium hydroxid solution are added drop by drop. Then the remainder of the mercuric acetate solution is added as before. When this is completed the temperature is raised to 80° C. and the mixture stirred well until a test no longer shows the presence of free mercuric oxid. The test may be carried out by taking one c. c. of the mixture, adding a little water and a few drops of 5% sodium hydroxid. The reaction is considered complete when the alkali does not produce any turbidity. A brilliantly clear solution is required. When the formation of the ortho-nitro-phenol mercuric acetate is completed the mixture is allowed to cool for two hours. The heavy yellow precipitate is then filtered off by suction and washed with boiling distilled water containing 10 c. c. of glacial acetic acid in 3000 c. c. of water, until it is practically free from the unchanged ortho-nitro-phenol. The precipitate is well triturated in a mortar with 500 c. c. cold distilled water. The mixture is brought to a solution by 40 grs. of sodium hydroxid which are dissolved in 100 c. c. of water. A clear red solution is produced. Any undissolved matter should be filtered off. This solution is allowed to stand several hours in an evacuated glass container; then again filtered and the perfectly clear filtrate evaporated *in vacuo* until a rich crystallization is secured. This product is now to be transferred into an evaporating porcelain dish and the evaporation continued until the product becomes very thick; it is then allowed to stand for an hour in the cold; filtered; and the precipitate placed in a porcelain dish on a water bath, until it turns into dry powder, which is the ultimate finished product and a solution of which in the proportion of 1 to 2000 of distilled water or 1 to 5000 is adapted to most of the uses stated.

Having thus described our invention, we claim:

1. The new product described which is an oxymercury nitrophenolate resulting from the reaction of an alkali salt solution of nitrophenol on an excess of mercuric acetate.

2. The new germicide and antiseptic described, which is an alkali salt of oxy-mercury nitro-phenol, of brick red color, in powdered form, containing 50% plus of mercury, and freely soluble in water.

3. The new sodium oxy-mercury-ortho-nitro-phenolate, containing 50% plus of mercury and having the following structural formula

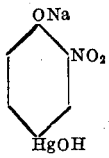

4. The new product described which is an alkali salt of a mercuric ortho-nitro-phenol compound, brick red in color, having a decomposition point of about 290° C. freely soluble in hot water, and having the empiric formula, for a sodium salt, of $C_6H_4NO_4HgNa$.

5. The process described of producing a mercuric-nitro-phenol compound which comprises admixing, in an alkali salt solution, nitrophenol, with an excess of mercuric acetate, forming a precipitate therefrom; filtering and washing the precipitate with an aqueous solution of glacial acetic acid to free it from unchanged nitrophenol; redissolving it in an aqueous solution of the same hydroxid, cooling and filtering the solution, and crystallizing the filtrate.

6. The process of producing a mercuric-nitrophenol compound, which comprises dissolving an alkali salt of nitrophenol admixed with an excess of mercuric acetate, heating and mechanically agitating the admixture until the reaction no longer discloses the presence of free mercuric oxid; filtering and washing the residual with an aqueous solution of glacial acetic acid for the removal of any unchanged nitrophenol; triturating and dissolving the resultant in an aqueous solution of an alkali hydroxid, concentrating the solution *in vacuo* to form a crystalline precipitate, then cooling to complete crystallization, and finally filtering and drying the crystalline precipitate to reduce it to a powder.

In testimony whereof, we have hereunto affixed our signatures this 16th day of April, A. D. 1920.

JAY FRANK SCHAMBERG.
GEORGE W. RAIZISS.
JOHN A. KOLMER.

Witnesses:
  I. M. TUNIS,
  ALEXANDER PARK.